Feb. 6, 1968     E. S. KORDYBAN ETAL     3,367,530
THERMAL INSULATING STRUCTURE
Filed Aug. 29, 1963     10 Sheets-Sheet 1

INVENTORS
EUGENE S. KORDYBAN
LADISLAS C. MATSCH
OSCE P. ROBERTS, Jr.
BY William F. Mesinger
ATTORNEY INVENTORS
EUGENE S. KORDYBAN
LADISLAS C. MATSCH
OSCE P. ROBERTS, Jr.

BY William F. Mesinger
ATTORNEY

Feb. 6, 1968 E. S. KORDYBAN ET AL 3,367,530
THERMAL INSULATING STRUCTURE
Filed Aug. 29, 1963 10 Sheets-Sheet 5
FIG. 7
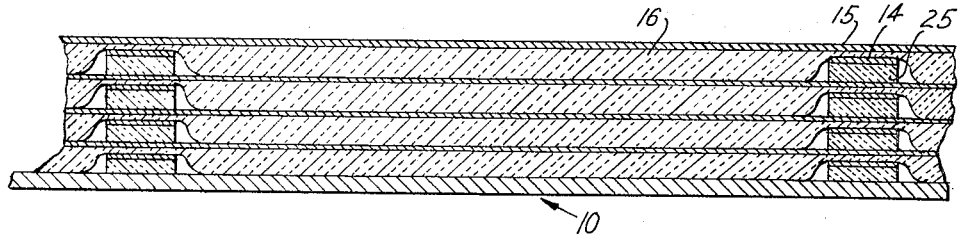
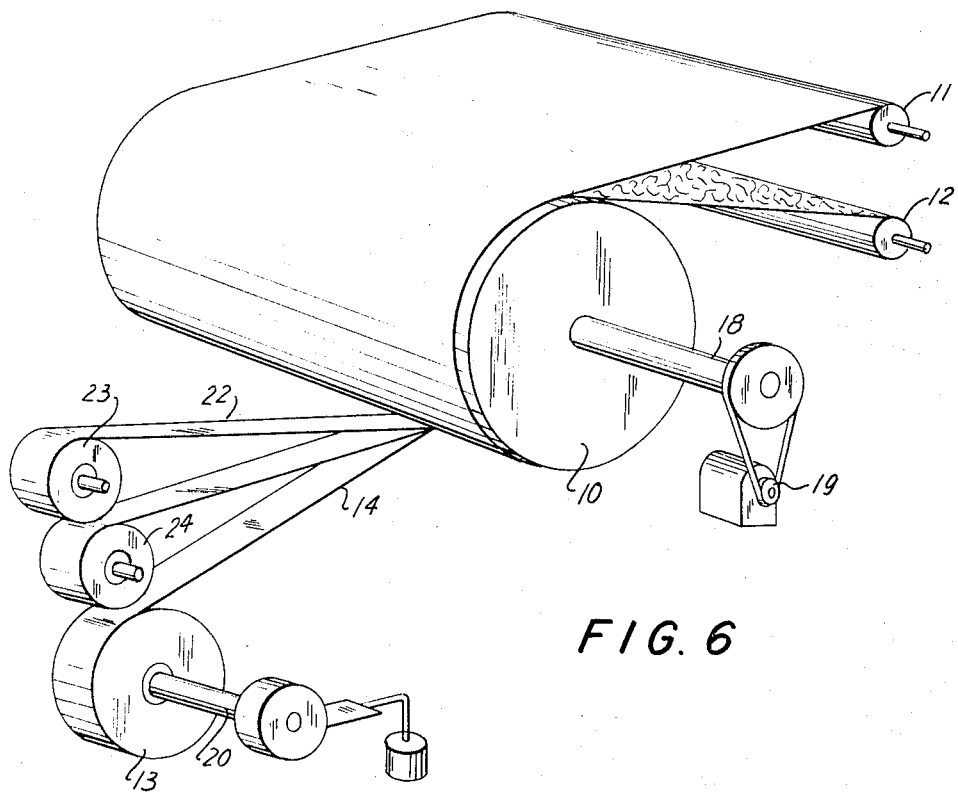
FIG. 6
INVENTORS
EUGENE S. KORDYBAN
LADISLAS C. MATSCH
OSCE P. ROBERTS, Jr.
BY William F. Mesinger
ATTORNEY

SPIRALLY BANDED SI-62 INSULATION WITH FILLER

Feb. 6, 1968 E. S. KORDYBAN ET AL 3,367,530
THERMAL INSULATING STRUCTURE
Filed Aug. 29, 1963 10 Sheets—Sheet 10

INVENTORS
EUGENE S. KORDYBAN
LADISLAS C. MATSCH
OSCE P. ROBERTS, Jr.
BY *William F. Meringer*
ATTORNEY

3,367,530
THERMAL INSULATING STRUCTURE
Eugene S. Kordyban, Buffalo, Ladislas C. Matsch, Kenmore, and Osce P. Roberts, Jr., Grand Island, N.Y., assignors to Union Carbide Corporation, a corporation of New York
Continuation-in-part of application Ser. No. 118,742, June 21, 1961. This application Aug. 29, 1963, Ser. No. 306,408
10 Claims. (Cl. 220—9)

This is a continuation-in-part of application Ser. No. 118,742, now abandoned, filed June 21, 1961 in the names of E. S. Kordyban et al.

This invention relates to a method and apparatus for conserving and dispensing valuable materials, and more particularly to thermal insulating structures enclosing an evacuated space as, for example, between the product holding inner vessel and the outer casing of double-walled containers. Still, more particularly, this invention relates to a multiple-layer type of thermal insulating system which is particularly suitable for minimizing the atmospheric heat inleak through the evacuated insulating space to produce liquids as, for example, low-boiling cryogenic liquefied gases such as liquid oxygen and hydrogen.

As used herein, the expression "thermal insulating structure" includes any construction which is gas-tight and evacuable to sub-atmospheric pressure so as to reduce heat transfer through the structure's cross-section. The term "container" includes any construction capable of holding valuable materials as, for example, tanks, pipelines and rectification equipment.

The art has recently discovered composite insulating systems which are remarkably effective in reducing heat transfer by conduction and radiation. These systems are a flexible composite of a low heat conductive material component and a radiant heat barrier material component assembled sufficiently closely to provide at least 4 flexible layers per inch of composite insulation. The low conductive material is disposed generally perpendicular to the direction of heat transfer across the evacuated space, and serves to separate the several radiant heat barrier elements or components so that the latter are confined to substantially isothermal planes within the insulation. These systems are particularly suitable for insulating cryogenic liquids in double-walled containers from the effects of atmospheric heat inleak. The composite insulating material is installed in the evacuable space between the cryogenic liquid storing inner vessel and the outer casing and has been found to be at least ten times as effective as the conventional powder-in-vacuum system. Such insulations are described and claimed in U.S. Patent Nos. 3,007,596 and 3,009,600, respectively. These disclosures are incorporated herein by reference, and describe a composite of low conductive permanently precompacted fibrous paper material with a radiation-impervious reflecting component such as aluminum foil. Another suitable type of low conductive-radiation impervious composite insulation is a reflective metal-coated, non-metallic low conductive substrate material as, for example, the aluminum-coated polyethylene terephthalate film described in U.S. Patent No. 3,018,016 to M. P. Hnilicka, Jr. Another satisfactory metal-coated substrate is thin metallized paper such as metallized glassine.

Still another composite multi-layered insulation for use in a vacuum space between warm and cold boundaries consists of the paper layers and finely-divided radiant heat reflecting bodies of less than about 500 microns in size, being incorporated in and uniformly dispersed through the layers, as well as a binder for cementing the heat reflecting bodies to the fibers.

A still further composite multi-layered insulation for use in a vacuum space between warm and cold boundaries consists of alternating layers of a radiation-impervious reflecting component such as aluminum foil and a low heat conductive component of cellulose paper of the kraft type.

Most multiple layer composite insulations of the high quality, vacuum-type are extremely sensitive to compression within the range of densities corresponding to best performance. For example, FIG. 1 herein shows the variation in conductivity for an illustrative composite insulation which results from compressing more and more layers into a given thickness of insulation. This particular insulation is composed of 0.00025 in. thick soft annealed aluminum foil having an emissivity of 0.058, alternating within precompacted glass fiber paper weighing 1.6 gm. per sq. ft. and composed of fibers whose average diameter is between 0.5 and 0.75 micron. Curves A and B represent the contributions to overall heat conduction by radiation and solid conduction, respectively, while curve C is the total conduction obtained as the summation of curves A and B. Curve C is an accurate representation of the overall performance of the composite insulation, provided that gaseous conduction is eliminated by virtue of a low absolute pressure below 1.0 micron of mercury and preferably below 0.1 micron of mercury.

For best results, the specific insulation characterized by FIG. 1 should be wound loosely with only about 60 layers per inch thickness, thereby achieving thermal conductivity near the minimum value of $0.021 \times 10^{-3}$ B.t.u./hr. x sq. ft. x °F./ft. However, it has often been found impossible to obtain such loose density in commercial systems using prior art wrapping techniques. Densities considerably greater than the optimum can be produced in some instances simply by the weight of the materials themselves when stacked on a horizontal surface to thicknesses of, for example, 3–4 inches. More severe overcompression results when the insulation is wound in thick layers on large cylindrical or spherical vessels. The portions of the insulation which rest on upward-facing surfaces of the vessel must support the remainder of the insulation which hangs about the vertical and under-surfaces of the vessel. Thus, the insulation on the top surfaces is severely overcompressed while that below the vessel tends to sag and produce large void spaces within the blanket of insulation. The shape of curve C in FIG. 1 shows that either departure from the optimum number of layers per inch is highly undesirable.

Consider for example, a horizontal cylindrical tank 5 feet in diameter on which it is desired to install 4 inches of the insulation of FIG. 1. By wrapping the materials very loosely, an average density of 60 layers per inch thickness can be achieved corresponding to the optimum value of curve C. However, the density in the vicinity of the top center line of the tank will be about 90 to 100 layers per inch, while that at the bottom will average only perhaps 40 layers per inch throughout its thickness. Inspection of curve C of FIG. 1 shows that the large areas thus over- and under-compressed will exhibit thermal conductivities much higher than the optimum value. A tank so insulated will also be difficult to handle or move about without shifting the loose insulation. Standing the tank vertically, or imposing only slight axial accelerations, will cause the insulation to "telescope" and slide off the tank.

The magnitude of this general problem which is common to all of the above-mentioned composite insulations may be better understood by considering the internal compression exerted between layers of the insulation. Stability against sagging and slippage depends upon the development of restraining frictional forces between the various component layers. The coefficient of friction between fine glass fibers and aluminum foil, for example, is not high (about 0.6) so that a measurable pressure must be exerted normal to the layers in order to generate sufficient restraining force. However, if the insulation of of FIG. 1 were assembled conventionally to the optimum 60 layers per inch, the interlayer pressure would be immeasurably small (below .001 p.s.i.), many-fold less than the pressure needed for stability under normal commercial service. In fact, the interlayer compression at optimum density is so low that the insulation might be properly visualized as consisting of a series of essentially freestanding foil shields which make only slight contact with the fiber separator.

It follows that a critical problem often encountered in the use of high quality multi-layer composite insulations is the absence of sufficient inter-layer frictional force to maintain uniform density and avoid displacement of the insulation. Heretofore, a partial remedy for sagging and instability has been to wrap the insulation more tightly and thereby eliminate the voids and increase interlayer friction. However, the consequences of obtaining stability by the simple expedient of tightening the layers as they are applied is very severe. It has been observed that in the range of low interlayer compression corresponding approximately to optimum conditions, only a slight increase in compression will produce an extremely large increase in thermal conductivity. For practical usage, the minimum interlayer pressure needed for stability, even in light service, may be 20 times greater than the ideal pressure. The thermal conductivity $k$ corresponding to such high pressure can easily be two or three times the optimal low value which is sought.

Another damaging consequence of tightening the layers as they are applied is the drastic reduction in insulation thickness. This means that if a given number of total layers of insulation is tightened sufficiently to achieve a stable condition, the thermal conductivity $k$ will not only increase greatly, but the thickness $t$ will also be reduced, thereby producing two highly detrimental effects on the insulation performance. The alternative of adding additional layers to overcome the reduction in thickness results in greatly increased cost and weight of the insulation.

These problems are partially overcome by a system for stabilizing multi-layer insulation described and claimed in copending application Ser. No. 118,740, now abandoned on Aug. 30, 1963, and in the name of David I-J Wang. In this system multiple tension bands extend laterally around the insulation outer surface, and are spaced longitudinally along the storage container. These bands constitute means for concentrating the total frictional force between the layers of composite insulating material in a minor part of the total insulated area whereby the minor part is above its stable density and the remaining major part of such area is maintained below its stable density. As used herein, the phrase "stable density" refers to the insulation density to which the entire composite insulation body would have to be compressed uniformly in order to achieve mechanical stability without use of the tension bands, under the expected conditions of handling and service of the insulated apparatus.

There are, however, certain limitations in the external banding system, particularly when used with large diameter vessels and with thick insulation. For example, the entire insulation blanket or a substantial portion thereof must be applied at the approximate average density which, upon banding, will provide the desired uniform density. During the wrapping procedure, the average density cannot be determined or controlled with accuracy due to sagging, and the desired average density after external banding can be approached only by exercising great skill developed by costly trial and error.

Another disadvantage of external banding is that instability often causes axial slippage while wrapping is in progress even though the vessel is positioned horizontally. Insulation displaced in this manner cannot be restored to the desired position unless it is removed and rewrapped. A third disadvantage is that sagging which occurs while wrapping thick blankets of insulation often causes severe wrinkling and folding of layers within the blanket. The void spaces produced by sagging will move continuously around the rotating vessel and cause the inner layers to slide one against the other. This, in turn, causes these layers to wrinkle and fold.

An object of this invention is to provide a novel method of thermally insulating a structure enclosing an evacuated space with a multiple layer composite insulation such that the insulation system affords overall stability against sagging and slipping without causing a substantial sacrifice in its heat-impeding performance.

Another object of this invention is to provide an improved thermal insulating structure containing multiple-layer composite insulation having very thin layers of low heat conductive material and radiant heat barrier material without high interlayer compression and solid conductance.

A further object is to provide an improved thermal insulating structure containing multiple-layer composite insulation having very thin layers of low heat conductive material and radiant heat barrier material, with minimum overall thermal conductivity, characterized by an optimum degree of compression.

A still further object is to provide an improved method of assembling a multiple-layer composite insulation continuously to a product-containing vessel so as to afford a highly stable and efficient insulating system.

A still further object is to provide a double-walled cryogenic liquid container having an evacuable space between relatively warm and cold walls filled with a multiple-layer composite insulation having very thin layers of low heat conductive paper material and minimum overall heat transfer by solid conduction and radiation.

Additional objects and advantages of this invention will be apparent from the ensuing disclosure and appended claims.

In the drawings:

FIG. 6 is an isometric view of apparatus for assembling another embodiment of the invention;

FIG. 7 is an enlarged view, taken in cross-section, of a multiple layer insulation construction according to the present invention.

The present invention uses at least two principles: first, that increasing the compression on the multiple-layer insulation does not produce proportionate increases in thermal conductivity. This will be apparent from a close inspection of FIG. 2 which is the thermal conductivity vs. compression plot of the illustrative insulation of FIG. 1. It can be seen from this graph that the rate of increase in thermal conductivity $k$ in fact falls off appreciably at higher values of compression P, whereas one might have expected this relationship to be linear. For example, increasing the compression by 0.1 p.s.i. from essentially zero to 0.1 p.s.i. produces an increase in $k$ in excess of $0.025 \times 10^{-3}$ B.t.u./hr. sq. ft. °F./ft., which more than doubles the optimum conductivity. In contrast, increasing compression by 0.1 p.s.i. from 0.9 to 1.0 p.s.i. produces less than ⅕ as much increase in thermal conductivity $k$.

Figure 2:
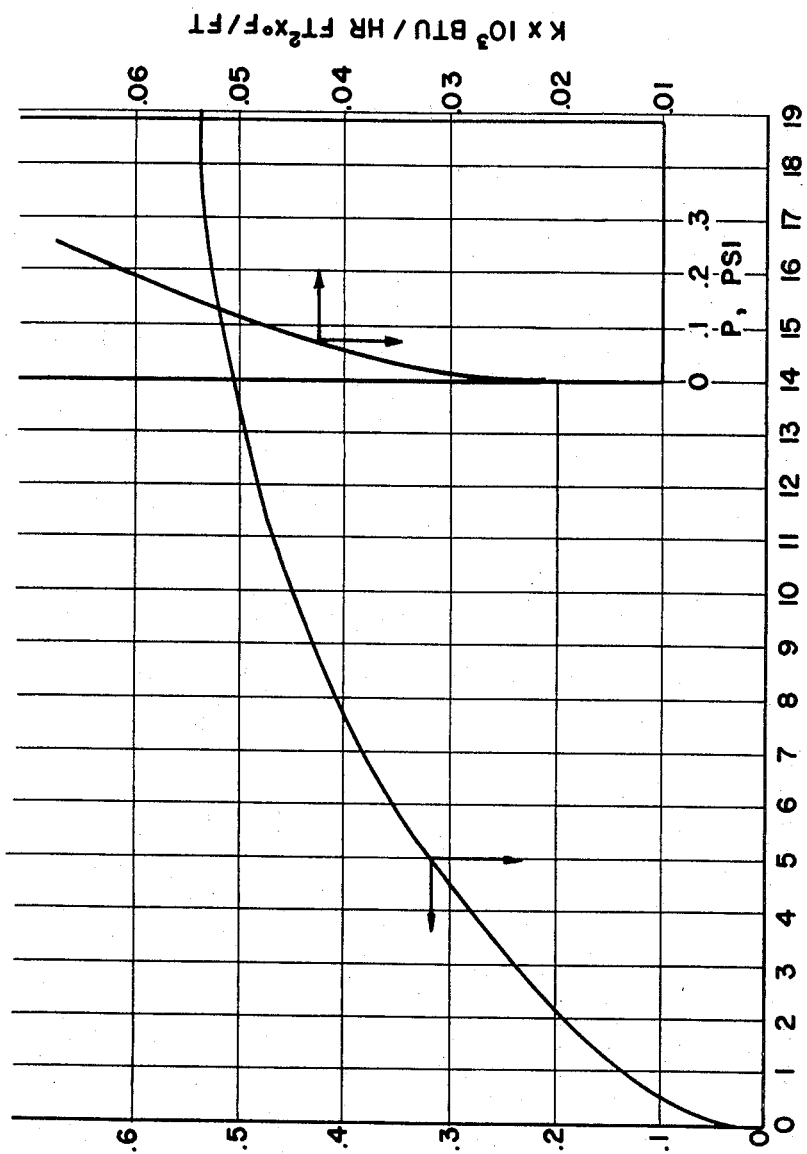
FIG. 2 is a graph showing the effect of compression on the thermal conductivity of the illustrative multiple-layer composite insulation of FIG. 1.
Figure 3:
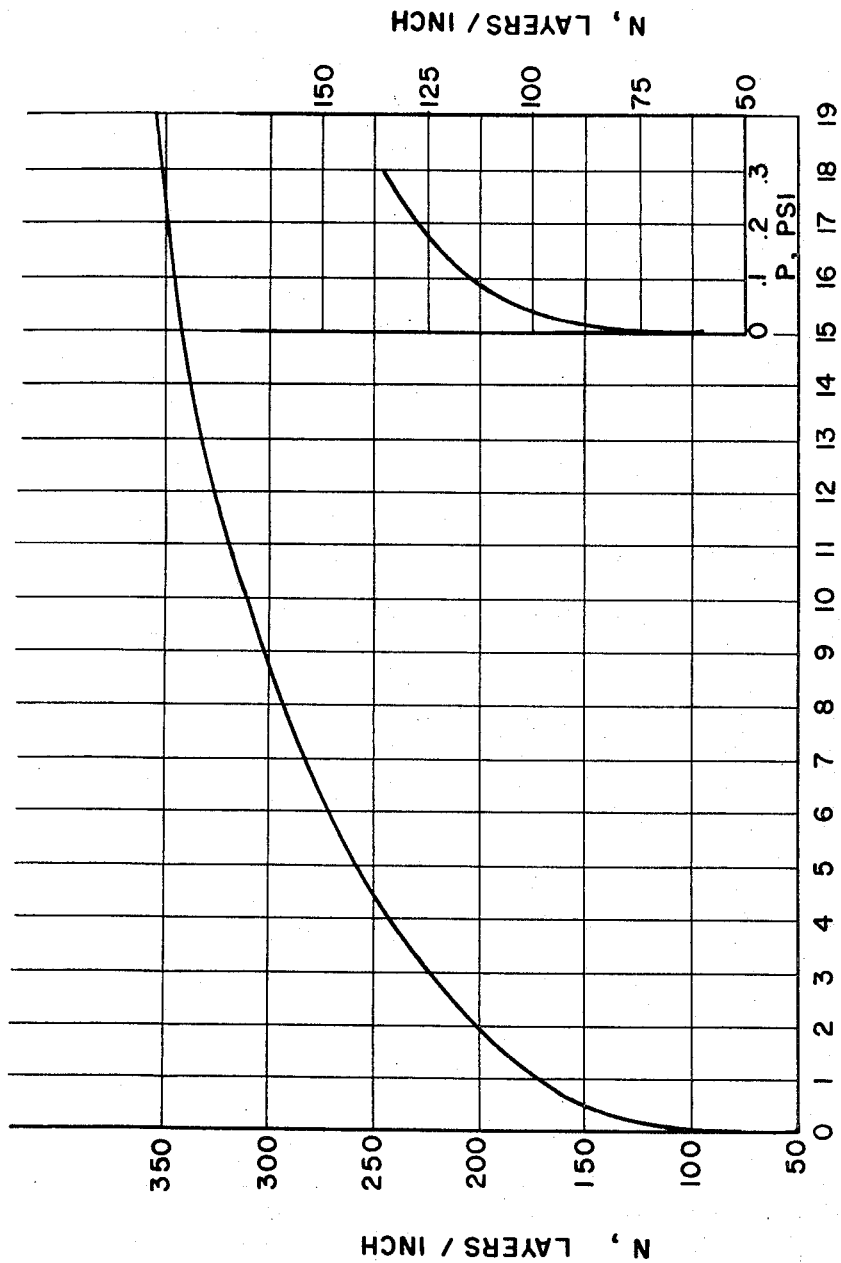
FIG. 3 is a graph showing the effect of compression on the density of the illustrative insulation of FIG. 1.

The second principle is that increasing the compression on the insulation to high values does not produce proportionate increases in insulation density as can be seen from a study of FIG. 3. Like FIG. 2 the rate of increase in layers per inch falls off appreciably at higher values of compression P.

The significance of these principles is as follows: Assume that stability of a given insulation system requires that a certain minimum restraining frictional force defined as $\eta P A_c$, be provided where $\eta$ = the coefficient of friction
$P$ = the interlayer compression
$A_c$ = area over which compression P is applied.

The shape of the curves FIGS. 2 and 3 shows that, for any required value of $\eta P A_c$ it is preferred to increase compression P to a high value over a small area than to increase P only slightly over a large area. Stability is best achieved with this insulation by maintaining almost all of the insulated area under essentially zero compression corresponding to minimum heat conductivity and optimal thickness and by compressing only a small portion of the area to a relatively high density. On the other hand, if thermal conductivity and density varied linearly with compression as might be expected, then there would be no advantage in reducing area $A_c$ by increasing compression P. In this event, the same impracticability high increase in thermal conductivity would be observed for any given value of frictional force $\eta P A_c$ regardless of the relative values of P and $A_c$.

One embodiment of the invention contemplates a method of thermally insulating a structure comprising gas-tight walls enclosing an evacuated space with a multiple layer composite insulation. The insulation comprises a low heat conductive material component and a radiant heat barrier material component. The insulation is assembled sufficiently closely in the space so as to provide at least 4 layers of composite insulation per inch of evacuable space cross-section. Both components are disposed generally perpendicular to the direction of heat transfer across the evacuated space. Tension band means are applied in contiguous adjacency with the composite insulation and under sufficient tightness thereagainst so as to concentrate the total frictional force between the composite layers in a minor part of the total insulated area and beneath such tension band means whereby said minor part of the total insulated area is above its stable density while the remaining major part of the total insulated area is maintained below its stable density.

Another embodiment of the invention contemplates a thermal insulating structure comprising gas-tight walls enclosing an evacuable space. A heat-insulative and radiation-impervious composite flexible insulating material is provided within this space, and comprises a low heat conductive material component and a radiant heat barrier material component assembled sufficient closely to provide at least 4 layers of composite insulation per inch of evacuable space cross-section. Both components are disposed generally perpendicular to the direction of heat transfer across the evacuated space. Tension band means are disposed in contiguous adjacency with the layers of composite insulating material. The bands are installed under sufficient tightness to concentrate the total frictional force between the composite layers in a minor part of the total insulation area beneath the bands whereby the minor part is above its stable density while the remaining major part of such area is maintained below its stable density.

More specifically, a preferred embodiment contemplates an apparatus provided with a gas evacuated insulating space contiguously associated with a double walled heat transferable container and gas-tightly enclosed by the double walls. A heat insulative and radiation-impervious composite flexible insulating material is contiguously associated with the heat transferable container in the insulating space. This material comprises a multiplicity of alternating radiant heat barrier means and low heat conductive, permanently precompacted fibrous paper layers composed of fibers having diameters less than about 20 microns being disposed generally perpendicular to the direction of heat transfer across the insulating space. Tension band means are disposed in contiguous adjacency with the composite flexible insulating material. The bands extend laterally around the container and are spirally wound with the composite flexible insulating material. The winding is sufficiently tight to concentrate the total frictional force between the fibrous sheet layers in a minor part of the total insulated area beneath the bands whereby the minor part is above its stable density and the remaining major part of such area is maintained below its stable density.

Figure 4:
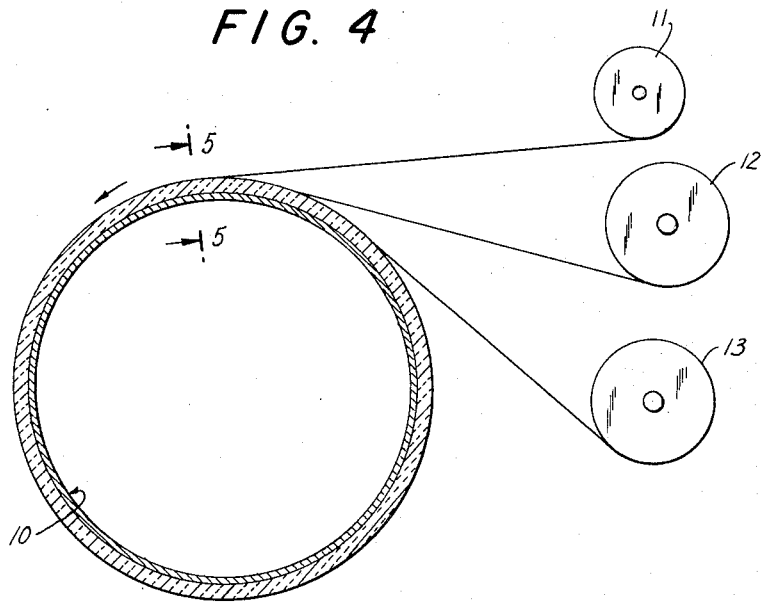
FIG. 4 is a schematic view, taken partly in cross-section, of apparatus for assembling one embodiment of the present invention.
Figure 5:
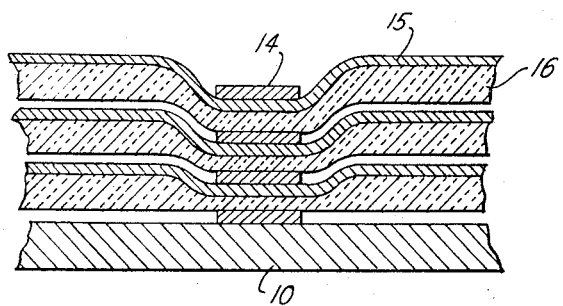
FIG. 5 is an enlarged view, taken in cross-section, of a novel insulation construction according to this invention, and assembled by the apparatus of FIG. 4.

Referring now to FIG. 4, apparatus is shown for spiral banding a container 10 according to one embodiment of the invention. Roll 11 of a thin, flexible radiant heat barrier material component, e.g. aluminum foil, roll 12 of a low heat conductive material component, e.g. glass fiber paper, and roll 13 of tension band material, e.g. aluminum foil, are provided, and their ends are attached to the surface of the container by suitable means, e.g. an adhesive compound. The container 10 is then axially rotated by suitable power means and the three insulation components are simultaneously spirally wound around its outer surface as illustrated in FIG. 5. In this manner, stability is obtained from the moment wrapping begins, and the insulation density can be readily controlled and made uniform over the entire vessel surface. The tightness (i.e. density) of the major portion of the insulation between the bands 14 is conveniently controlled by applying an adjustably slight tension to the radiation barrier sheet 15. The degree of support provided at the banded area is controlled by applying adjustably heavier tension to the banding strip 14. If glass fiber paper is employed as the low heat conductive material component, it should be applied under substantially no tension because of its fragile construction.

The desired tensions may be applied to band 14 and radiation barrier sheet 15 by means well-known to those skilled in the art, as for example variable tension brakes installed in the shafts which support the rolls. An apparatus particularly suitable for applying the instant foil-fiber composite insulation is disclosed in copending application, S.N. 805,793, now Patent No. 3,019,573, filed Apr. 13, 1959 in the name of Charles R. Navikas. This apparatus includes a machine frame for rotatably supporting the container, a foil roll and a fibrous sheeting roll rotatably mounted in the frame. Rotating means are provided for controllably rotating the container, as are drive means for rotating the fibrous sheeting roll at a speed correlated to the container speed to feed fibrous sheeting thereto with slack. The machine also includes means for rotating the metal foil to roll foil around the container under an adjustably uniform tension. To this apparatus may be added a banding roll and means for rotating such roll to roll banding around the container under an adjustably uniform and higher tension. That is, the banding is adjustably tensioned during delivery to the container so as to compress the minor part of the total insulated area above its stable density. Also, the low heat conductive fibrous sheet layers and the radiant heat barrier means are delivered to and spirally wrapped around the container under low tension so as to maintain the major part of the insulated area below its stable density.

It should be understood that when the radiation barrier component and the low heat conductive component are formed into a unitary composite sheet before they are wrapped onto a container, a single roll of the composite insulation would replace the separate rolls 11 and 12 in the apparatus shown in FIG 4. This would be the case, for example, when the composite insulation being wrapped is of the reflective metal-coated non-metallic low conductive substrate material type, or of the finely-divided radiant heat reflecting material-containing paper type.

Since the banding strip spirals through the insulation, it will assume the same temperature gradient as the insulation and must therefore be more carefully selected than external bands. For cryogenic vessels, the thermal contraction of the band should preferably be equal to or greater than that of the inner container so that the bands will not relax when the vessel and insulation are cooled. The opposite relationship is preferred for high-temperature service. Furthermore, the cross-section area of the band should be minimized consistent with strength requirements so as to reduce the weight and heat capacity of the insulation.

Figure 1:
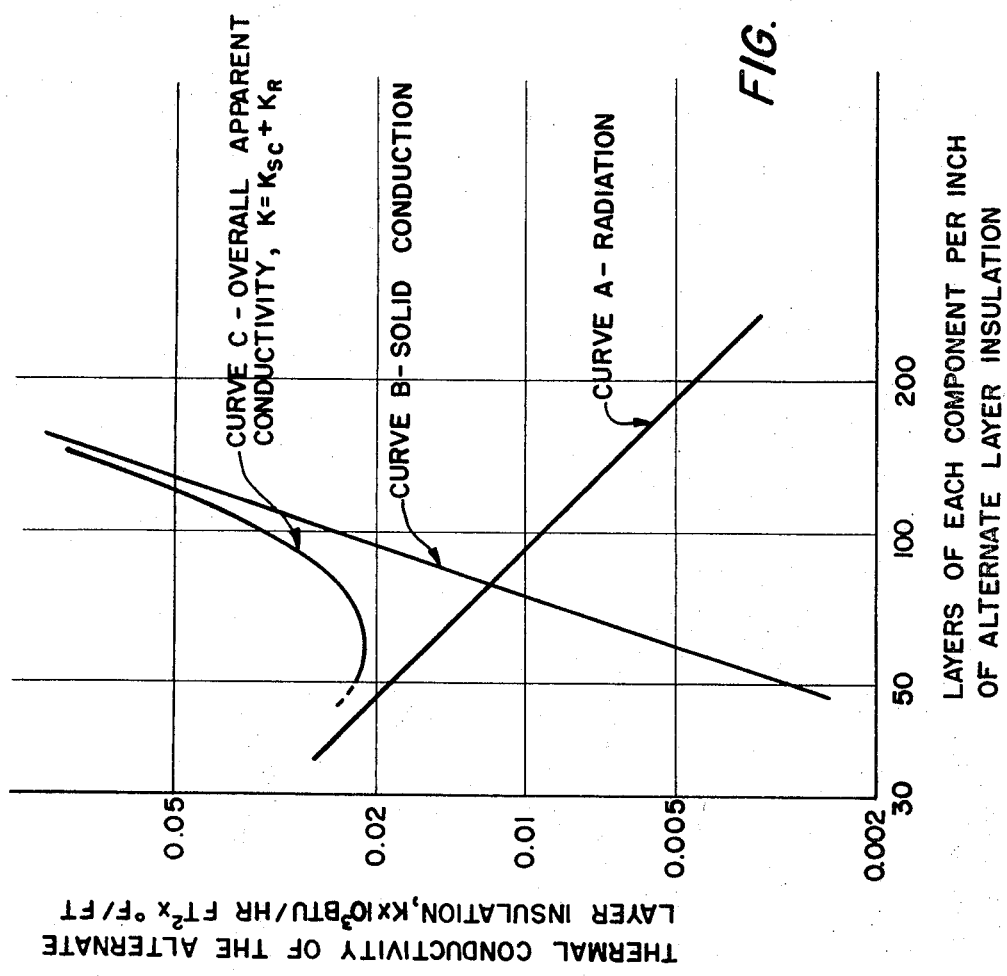
FIG. 1 is a graph showing the effect of increasing the number of layers per inch on the thermal conductivity of an illustrative multiple-layer type composite insulation.

As previously discussed, the desired degree of stability is obtained by exerting heavier tension on the band as it is applied. The band tension required to produce a desired band compression $P_c$ can be predicted by the equation:

$$T = \frac{P_c DS}{1 + \sqrt{1 + \frac{D^2(dP/d\rho)\rho^2}{Et_b W_g}}} \quad (1)$$

where
$T$=band tension, pounds
$P$=band compression, p.s.i.
$D$=vessel diameter, inches
$S$=band width, inches
$\rho$=density of the low conductive, compressible component of the insulation under compression $P_c$, lb./cu. in.
$E$=modulus of elasticity of the band, p.s.i.
$t_b$=band thickness, inches
$W_g$=unit weight of the low conductive, compressible component of the insulation between band laps, lb./sq. in.
$dp/d\rho$=slope of the pressure-density curve for the low conductive, compressible component at $P_c$, inches As an example illustrating the use of the above equation, assume than an 80-inch diameter vessel is to be insulated with the aluminum foil-precompacted glass fiber paper composite insulation on which FIG. 1 is based, and is stabilized with a band compression of 2 p.s.i. Let the band be hard aluminum with values of width S, thickness $t_b$ and modulus of elasticity equal to 1.75 in., 0.002 in. and $10 \times 10^6$ p.s.i., respectively. The value of $W_g$ required at 2 p.s.i. for 60 layers/inch is 5.2 gm./sq. ft. or $.80 \times 10^{-4}$ lb./sq. in. since the space between the foils occupied by the glass fiber paper material is about .0144 in., the density $\rho$ of the fiber material is $0.08 \times 10^{-4}/.0144$ or about $0.55 \times 10^{-2}$ lb./cu. in. Tests with glass fiber paper of 1.6 gms./sq. ft. will show that at 2 p.s.i. the value of $dp/d\rho$ is about 1,940 (inches). Solution of Equation 1 using these values gives $T=17$ lb.

After wrapping has proceeded to the desired thickness, the free edges of the components may be secured by, for example, taping or by an external band girding the vessel over the banded area.

For insulating vessels longer than the width of the sheet material, several rolls of material may be aligned end-to-end on a shaft, the combined length of the rolls being at least equal to that of the vessel. The tension of all rolls assembled on a single shaft may be controlled by the same friction brake.

The number of bands applied will depend upon the length of the vessel and on the stability desired. A single band may suffice in some instances for insulating small vessels subjected to low axial accelerations. Normally at least two bands will be needed one near each end of the vessel. Maximum band spacing along the vessel length will also be limited by the stiffness of the insulation. The blanket should be reasonably self-supporting between band locations so that it does not sag against the vessel and become over-compressed due to its own weight. With light-weight insulation consisting of thin glass fiber paper and ½ to ¼ mil soft annealed aluminum foil, for example, experience has shown that 48-inch band spacing is suitable, while spacing beyond 72 inches may permit excessive sagging.

Another factor which effects band spacing is the width of the sheet material which is tensioned to control density. Preferably a band should be applied within the width of each sheet needed to cover the length of the vessel. For example, assume that a 12-ft. long tank is insulated using three side-by-side rolls of aluminum foil each 4 ft. wide, the foil being tensioned to control density. At least three bands are preferably used, one near the center of each sheet. Alternatively, four bands may be used, one at each end of the vessel and one at each of the two foil sheet abutments along the tank length.

The total frictional force developed in the compressed areas should be based on the most severe stress expected in service. Normally, axial accelerations will produce the most severe slipping force on the insulation, and such force will be the controlling factor in planning for stability. A force balance equation may be written in which the force exerted on the insulation by acceleration is equated to the restraining frictional force between layers developed by compression:

$$G \times W \times N \times A_T = \eta \times A_c \times P \quad (2)$$

where $G$=maximum acceleration expressed in number of gravitational units (dimensionless)
$W$=unit weight of one complete layer of composite insulation (radiant barrier component+low conductive component), lb./sq. in.
$N$=total number of complete layers
$A_T$=total area of insulation which must be restrained by interlayer friction, sq. in.
$\eta$=coefficient of friction between insulation components (dimensionless)
$A_c$=area of insulation under localized compression, sq. in.
$P$=pressure applied on area $A_c$, p.s.i.

No factor has been included in the above equation for the restraining force contributed by the uncompressed area of insulation. As stated previously, the interlayer compression at optimum density is immeasurably small and should properly be neglected.

Equation 2 may be used to determine the quantity $A_c \times P$ needed to achieve stability of a given insulation subjected to acceleration G. It is obvious that the relative values of $A_c$ and $P$ can be varied at will. By increasing the compression P, the area $A_c$ under compression can be reduced. In view of the shape of the curve, FIG. 2, $A_c$ should be minimized by using relatively high compression. The theoretical upper limit of compression is a very high value at which the elements of the low conductive material component begin breaking and crushing or otherwise are permanent deformed. The practical upper limit of compression is fixed by the strength of the banding material used to produce the compressive force. For fine glass fiber fillers, for example, suitable values of compression which avoid the practical upper limit and also permit small areas under the compression means fall between 0.1 and 20 p.s.i. Preferred values are between 0.2 and 10 p.s.i.

Equation 2 may be modified to express conditions corresponding to "stable density" as defined previously herein. Since at stable density, the insulation is all at uniform density, the compression P will be applied over the entire area, or $A_c = A_T$.

$$G \times W \times N = \eta \times P_s \quad (3)$$

The value of $P_s$ denotes the compression required without the use of this invention to obtain stability of N layers of insulation of weight W subjected to acceleration G.

The performance of insulation stabilized in accordance with this invention and to Equation 2 of this invention may be predicted using the following equation:

$$Q_B = \frac{\Delta T}{N} \{[(A_T - A_C)k_o \cdot n_o] + [A_c \cdot k_c \cdot n_c]\} \quad (4)$$

where $Q_B$ = total heat transmission through stabilized insulation, B.t.u./hr.

$\Delta T$ = temperature difference across the insulation, ° F.

$k_o$ = thermal conductivity of the major, uncompressed portion of the insulation, B.t.u./hr. x sq. x ° F./ft.

$n_o$ = number of complete layers of uncompressed insulation per foot of thickness $k_c$ = thermal conductivity of the minor, compressed portion of the insulation, B.t.u./hr. x sq. ft. x ° F./ft.

$n_c$ = number of complete layers of compressed insulation per foot thickness.

Values of $k_c$ and $n_c$ may be read from curves such as FIGS. 2 and 3 using the value of P needed to satisfy Equation 2. Values of $k_o$ and $n_o$ are correlated in a curve such as C of FIG. 1. Preferably they should correspond closely to the minimum point of the curve.

For comparison, the performance of insulation wrapped tightly to stable density may be predicted using the conventional heat transfer equation:

$$Q_S = \frac{k_s A_T \Delta T n_s}{N} \quad (5)$$

where $Q_S$ = total heat transmission through "stable density" insulation $k_s$ = thermal conductivity of "stable density" insulation, B.t.u./hr. x sq. ft. x ° F./ft.

$n_s$ = number of complete layers of "stable density" insulation per foot thickness.

Values of $k_s$ and $n_s$ may be read from curves such as FIGS. 2 and 3 using the value of $P_s$ needed to satisfy Equation 3.

Let us now consider a specific example. Assume that it is desired to insulate a double-walled liquid nitrogen vessel with 120 layers of the materials of FIGS. 1, 2 and 3, so that it will withstand an acceleration of 4 $g$'s without slippage. In this case $G = 4$ $W = .49 \times 10^{-4}$ lb. sq. in. per layer $N = 120$ layers corresponding to 2 in. thickness at the optimum density of 50 layers/inch $\eta = 0.6$ Let $A_T = 1$ so that $A_c$ will be that fraction of the total area which is under compression. Then from Equation 2:

$$A_c P = \frac{4 \times 0.49 \times 10^{-4} \times 120 \times 1}{0.6} = 0.0392$$

If the insulation is compressed locally to 1 p.s.i., the area under compression is only $$A_c = \frac{.0392}{1} \times 100\% = 3.92, \text{ or } 4\%$$

Using the spirally wound bands, 2 in. wide bands spaced 50 in. apart will be adequate to stabilize the insulation.

To determine the performance of the insulation for the above case, Equation 4 is used, substituting values of $k_o$ and $n_o$ corresponding to the minimum point of curve C, FIG. 1, and using values of $k_c$ and $n_c$ corresponding to $P = 1$ p.s.i. from FIGS. 2 and 3. Specific values are:

$\Delta T = 70 - (-320) = 390°$ F.
$N = 120$ layers
$A_T = 1$
$A_c = 4\%$ or 0.04
$k_o = 0.021 \times 10^{-3}$ B.t.u./hr. sq. ft. ° F./ft.
$n_o = 60$ layers/inch or 720 layers/ft.
$k_c = 0.125 \times 10^{-3}$ B.t.u./hr. sq. ft. ° F./ft.
$n_c = 170$ layers/inch or 2040 layers/ft.

$$Q_B = \frac{390}{120}[(1 - .04)(.021 \times 10^{-3})(720) + (.04)(.125 \times 10^{-3})(2040)]$$

$Q_B = 0.080$ B.t.u./hr. x sq. ft.

The above performance may be compared with that corresponding to stable density. From Equation 3

$$P_s = \frac{4 \times .49 \times 10^{-4} \times 120}{6} = 0.0392 \text{ or } 0.04 \text{ p.s.i.}$$

From FIGS. 2 and 3, values of $k_s$ and $n_s$ corresponding to $P_s = 0.04$ are $0.037 \times 10^{-3}$ and 1240, respectively. Substituting into Equation 5, and letting $A_T = 1$ gives $$Q_s = \frac{0.037 \times 10^{-3} \times 1 \times 390 \times 1240}{120}$$

$Q_s = 0.149$ B.t.u./hr. x sq. ft.

Thus, it is seen that the heat transmission into the liquid nitrogen vessel with spirally banded insulation is only $(.080/.149) \times 100\%$ or 54% of that resulting from a conventional "tight" wrapping.

Referring again to FIG. 5, it will be noted that a rather severe reduction in insulation thickness occurs in the banded area due to the high compressibility of the low conductive component material. This is true even though this thickness reduction has been overemphasized in the drawing for purposes of illustration. The effect of this insulation thickness reduction is highly significant; it can easily account for one-half the total heat conducted through the banded area. It will also be recalled from FIG. 2 the compression causes an increase in conductivity which, while not proportionate to compression, is nevertheless quite appreciable. Thus, the heat transport through the banded area, determined as $Q_c = k_c A_c \Delta T / L$, increases due to a higher $k_c$ and increases still further due to reduced thickness L.

In a preferred embodiment of the invention, any reduction in thickness L is avoided, and to a limited degree the thermal conductivity $k_c$ of the banded area is also reduced. These remarkable improvements are achieved by providing low conductive, compressible bulking material in continguous adjacency and in coextensive relationship with the multiple tension band means. The bulking material is positioned between such band means and the composite flexible insulating material. For best results, the bulking material is of such thickness in the installed compressed state that the number of low conductive component layers per inch of composite insulation in the minor banded part of the total insulated area is substantially the same as the number of layers per inch in the remaining major, unbanded part of such area.

Apparatus suitable for spirally wrapping the container 10 with composite insulation including low conductive bulking material is illustrated in FIG. 6. For purposes of clarity, items corresponding to those shown in FIGS. 4 and 5 have been identified by the same reference numeral. Container 10 is cylindrically shaped and mounted horizontally on shaft 18 driven by a power device 19. Tension band roll 13 is mounted on shaft 20 equipped with a variable-force friction brake 21, and low conductive bulking material 22 is fed from rolls 23 and 24 onto container 10 beneath tension band 14. Simultaneously, low conductive component material, e.g. fibrous sheet and radiation barrier material, e.g. metal foil, are spirally wound on container 10 from rolls 11 and 12, respectively.

As mentioned in the description of FIG. 4, if the radiation barrier component and the low heat conductive component are formed into a unitary composite sheet before they are wrapped onto a container, a single roll of the composite insulation would replace the separate rolls 11 and 12. This would be the case, for example, when the composite insulation being wrapped is of the reflective metal-coated non-metallic low conductive substrate material type, or of the finely divided radiant heat reflecting material-containing paper type.

FIG. 7 is a cross-sectional view through several layers of composite insulation which could have been wrapped by the FIG. 6 apparatus, the layer thickness being exaggerated for clarity. The banded area consists of a multi-layered sandwich of materials under relatively high compression with the radiation barrier 15 interleaved at regular intervals. Between the banded sandwiches or stacks, the radiation barriers 15 "float" with virtually no contact pressure against the low-conductive separator. It will be apparent that the radiation barrier spacing is controlled by the thickness of material separating them in the banded area. Thus, the shield spacing will depend upon two factors: (a) the compressive force applied in the banded area, and (b) the amount of bulking material 25 inserted under the band.

As previously pointed out, the desired spacing of the radiation barriers is usually approximately determined by the density at which the unbanded composite insulation performs best. For a multiple layer glass fiber paper-aluminum foil insulation of the type characterized by FIG. 1, for example, the desired density will normally be about the minimum point on the overall thermal conductivity curve.

The compression exerted on the banded area is determined by the degree of stability required in order that the insulation will withstand a given acceleration expected in usage. Compression to above the value needed for stability is undesirable because it unnecessarily impairs thermal performance. From a knowledge of the compressibility of the bulking and low-conductive component materials, one may select the proper amount of bulking which will provide the optimal number of shields per inch (density) under the required compression. The shield spacing or density is preferably the same in both banded and unbanded areas so that uniform, full insulation thickness will result at all points.

Referring again to FIG. 7, it will be noted that tension bands 14 are thermally separated from adjacent radiation barriers 15 by low conductive component sheeting 16 on one side and by low conductive bulking 25 on the other side. When band 14 is formed of metal having a surface of low emissivity, e.g. aluminum foil, it acts as an extra radiation barrier and in effect doubles the number of radiation shields. This tends to reduce the radiation component of $k_c$ and improve the overall performance of the insulation. In order to prevent thermal short-circuit between bands 14 and radiation shields 15, bulking strip 25 is preferably of slightly greater width than the bands. The shielding effect of the band is more important when only small compression is needed under the band, because radiation is still a significant mode of heat transport. When high band compression is needed, the benefit of the extra shields is largely eliminated by higher solid conductance in the banded area.

A preferred bulking material consists of strips of the same material used for the low-conductive component. When the latter material is available in various thicknesses, combinations of thicknesses may be employed together to obtain the desired total amount of bulking under the band. It is to be understood, however, that the invention is not limited to such common identity of the low-conductive component and bulking materials.

Figure 8:
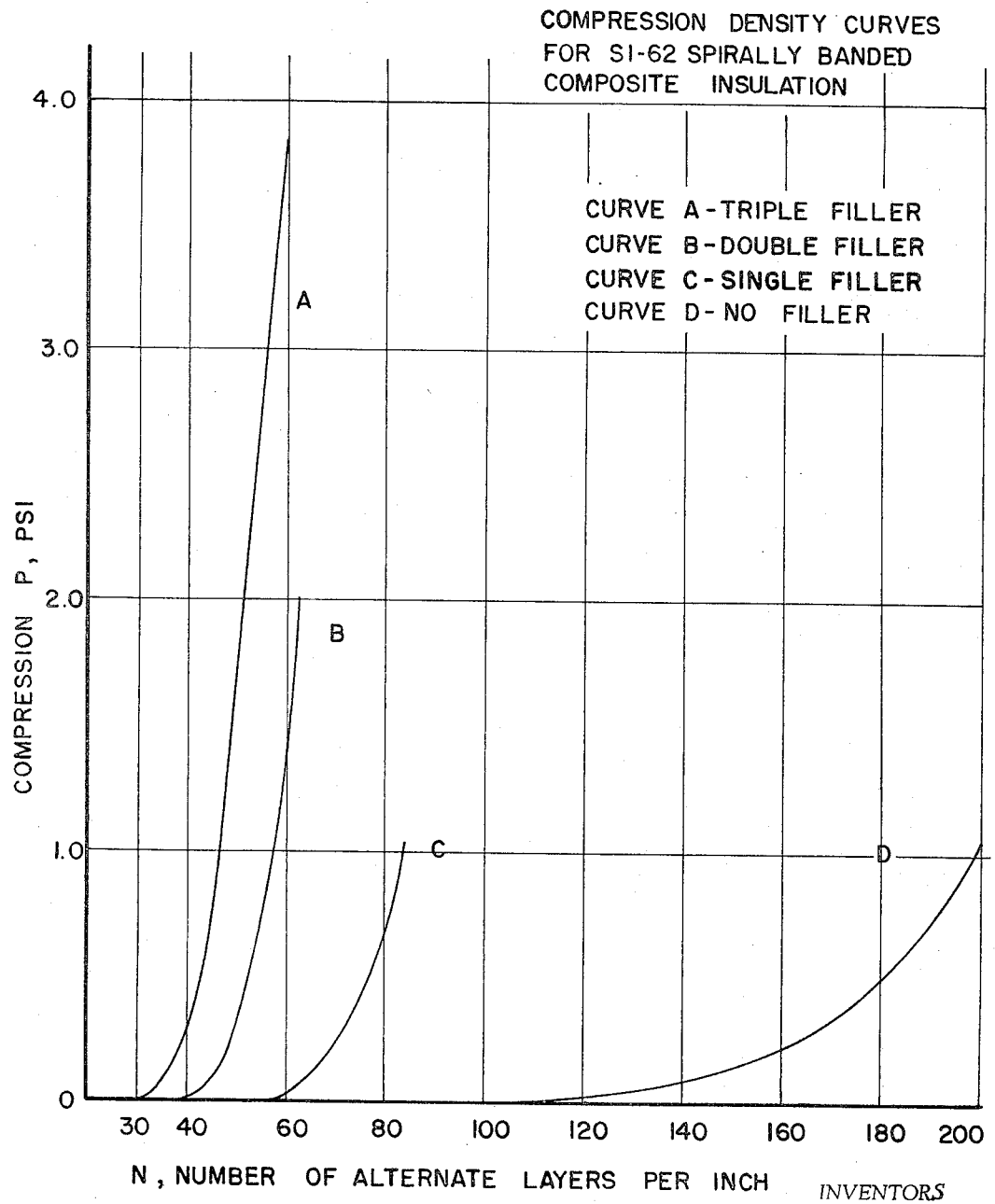
FIG. 8 is a graph showing the compression-density characteristics for various thicknesses of an illustrative filler insulation construction illustrated in FIG. 7.

The effect of varying the thickness of bulking material in an illustrative composite insulation, an aluminum foil-glass fiber paper composite insulation, is shown in FIG. 8. The bulking is the same material as the low conductive component, namely glass fiber paper weighing 1.6 gms./sq. ft. and composed of fibers whose average diameter is between 0.5 to 0.75 micron. Curves A, B and C represent the compression-density characteristic for triple, double, and single thicknesses of the bulking material, respectively. For comparison, Curve D shows the characteristic of the insulation without bulking. The optimal density of unsupported composite insulation is about 60 layers per inch, and it is clear from Curve D that such density cannot be obtained with any measurable pressure under the band when bulking is not used. When any appreciable compression is applied without bulking, the density increases rapidly and reduces the thickness as shown in FIG. 5. With single thickness bulking, 1.6 gm./sq. ft. fiber (Curve C), a small but measurable amount of compression can be applied while still maintaining the density at 60 layers per inch. Although such slight pressure with low percent-banding would not usually be suitable for mobile or portable service, it would be adequate to prevent sagging on most horizontal, stationary vessels.

With double-thickness (3.2 gm./sq. ft. total bulking), Curve B shows that 60 layers/inch is obtained with 1.45 p.s.i. band compression, which, for example, is sufficient to sustain about 3-$g$'s acceleration on 240 layers of glass fiber paper with 4% banding. In Curve A, triple-thickness bulking (4.8 gm./sq. ft. total filler) is compressed to 60 layers/inch by applying 3.85 p.s.i. compression adequate for about 7-$g$'s acceleration on 240 layers of glass fiber paper with 4% banding.

Curves A, B, and C represent the optimum amounts of 1.6 gm./sq. ft. glass fiber paper bulking needed for three illustrative values of compression. Other values of compression also corresponding to 60 layers/inch are obtained by substituting thinner or thicker layers of bulking for one or more of the 1.6 gm./sq. ft. strips.

Figure 9:
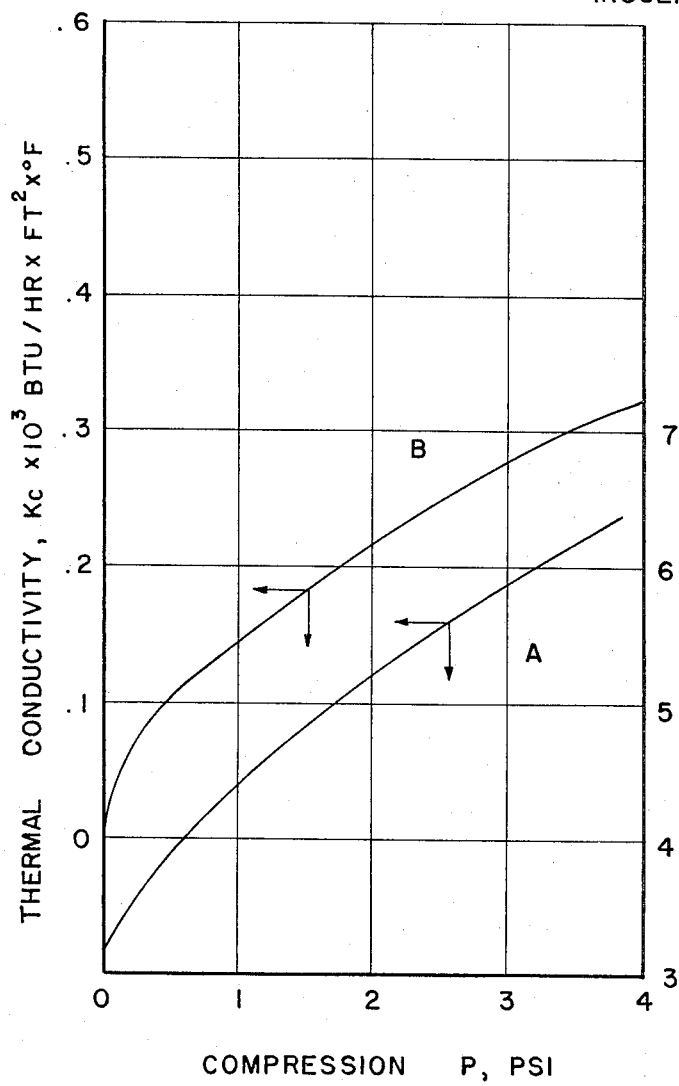
FIG. 9 is a graph showing thermal and physical characteristics of the illustrative FIG. 1 insulation construction compressed to 60 fibrous sheet layers per inch of composite insulation.

FIG. 9 shows thermal and physical characteristics of the illustrative FIG. 8 insulation. Curve A gives the total quantity of 1.6 gm./sq. ft. glass fiber paper, including the low conductive fibrous sheeting component, needed between aluminum foil radiation shields in the banded area to obtain 60 layers/inch with any value of compression up to 4 p.s.i. Curve B of FIG. 9 shows the corresponding thermal conductivity $K_c$ of the banded area.

The overall conductivity of the insulation is the sum of the contributions of the banded and unbanded portions, or $$k_a = (1 - A_c)k_o + A_c k_c \qquad (6)$$

where $k_a$ = the overall apparent conductivity B.t.u./hr. x ft.$^2$ x ° F./ft.

$k_o$ = the apparent conductivity of unbanded insulation area, B.t.u./hr. x ft.$^2$ x ° F./ft.

$k_c$ = the apparent conductivity of banded insulation area, B.t.u./hr. x ft.$^2$ x ° F./ft.

$A_c$ = the fraction of insulation area compressed under the band.

The expression for overall heat transmission per unit area through banded insulation is obtained by substituting the above expression for $k_a$ into the conventional equation $Q_B = k_a \Delta T/L$. This assumes that the insulation is at uniform thickness L, i.e. that the thickness is the same in the banded and unbanded areas. If desired, the thickness L may be expressed in terms of layers of insulation rather than dimensionally, using the relation $L = n_o/N$. The equation for heat transmission, expressed in rearranged form of Equation 4, then becomes:

$$Q_B = \frac{\Delta T n_o}{N}[(1-A_c)k_o + A_c k_c] \quad (7)$$

where $Q_B$ = heat transmission, B.t.u./hr. x ft.$^2$
$\Delta T$ = temperature difference, °F.
$n_o$ = number of continuous radiation shields per foot thickness
$N$ = total number of continuous radiation shields.

Figure 10:
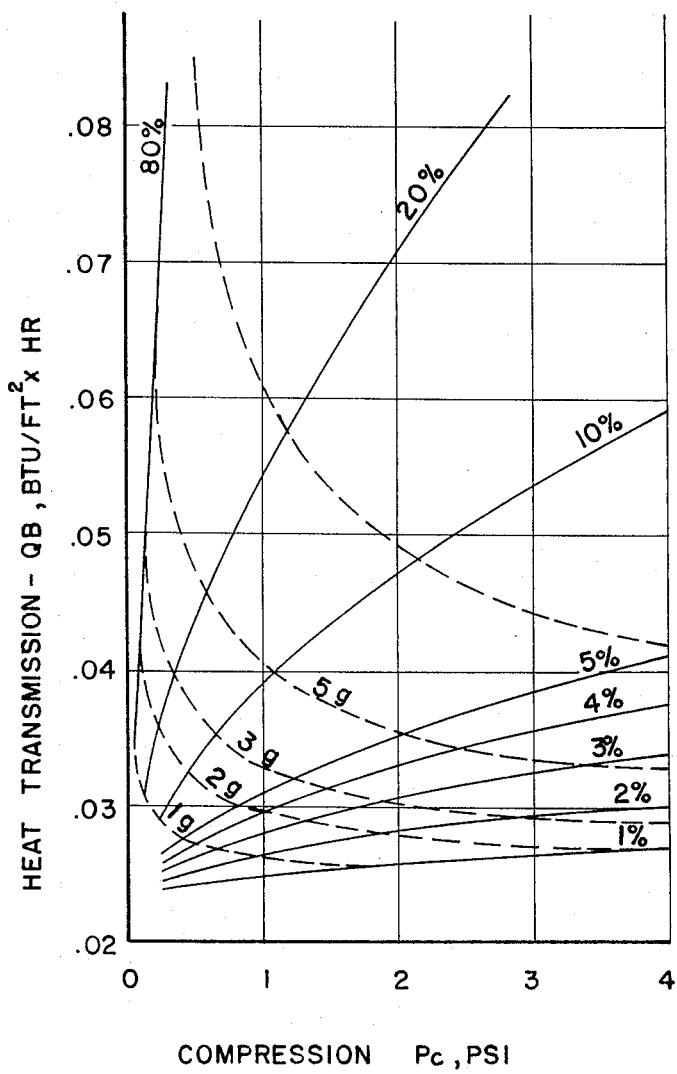
FIG. 10 is a graph correlating banding compression and overall heat transmission through 4 inches of the FIG. 9 insulation.
Figure 11A:
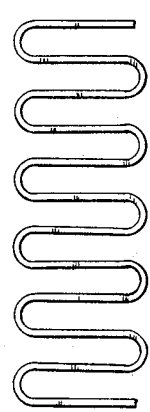
FIGS. 11a–11e show various flexible bands suitable for use in the present apparatus.
Figure 11B:
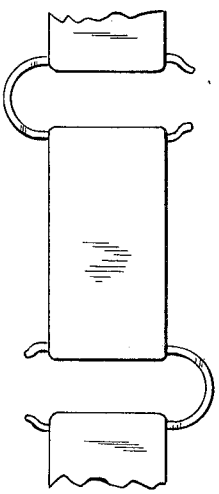
Figure 11C:
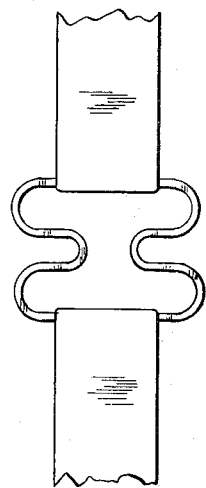
Figure 11D:
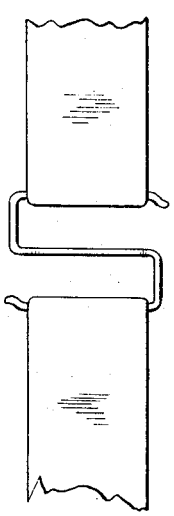
Figure 11E:
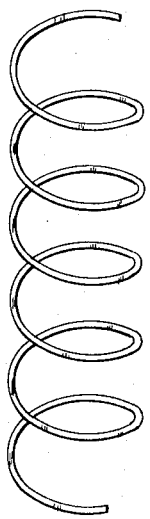

FIG. 10 is a graph which correlates banding compression $P_c$ and overall heat transmission $Q_B$ through 4 inches of the illustrative 60-layer/inch aluminum foil-glass fiber paper insulation of FIGS. 8 and 9. Solid curves represent various fractions $A_c$ of area under banding compression $P_c$. Dashed curves connect points on the percent-banded area curves at which insulation stability is obtained at constant values of acceleration g.

The thermal insulating quality of the preferred bulking embodiment of this invention may be compared with the no-bulking embodiment by means of FIG. 10. For example, assume that the insulation is banded over 2% of the area with 1 p.s.i. compression, sufficient for stability at about 1-g. acceleration. Without bulking, the heat transmission is 0.032 B.t.u./hr. x ft.$^2$; but with bulking, the transmission is only 0.027 or about 15% less.

With 5% banding and 2 p.s.i. compression, suitable for about 5-g's acceleration, the heat transmissions without and with bulking are 0.06 and 0.035 B.t.u./hr. x ft.$^2$, respectively, or about 42% less with bulking. As would be expected, an improvement in the thermal performance of the banded area becomes more beneficial to overall insulation performance as the banded area and/or compression become greater.

When considerable bulking is used under the band, the additional weight of the banding material should be considered when computing the force due to acceleration. The force balance Equation 2 becomes:

$$GN(WA_T + W_B A_c) = \eta A_c P_c \quad (8)$$

where $G$ = the maximum acceleration expressed in number of gravitational units (unitless)
$N$ = total layers of composite insulation
$W$ = unit weight of one complete layer of unbanded insulation, lb./sq. in.
$A_T$ = total insulated area, sq. in.
$W_B$ = unit weight of banding materials used in each layer of insulation, lb./sq. in.

The quantity $A_c P_c$ can be calculated from Equation 8. Relative values of $A_c$ and $P_c$ can be varied as long as the product satisfies the force balance. However, FIG. 10 shows that best thermal performance is obtained by minimizing $A_c$.

As examples of the outstanding success of the bulking embodiments, several liquid hydrogen truck trailers have been built using the spirally wrapped 0.0025-inch thick annealed aluminum foil-1.6 gm./sq. ft. glass fiber paper multiple-layer insulation, the latter being composed of fibers whose average diameter is 0.5–0.75 micron. The liquid hydrogen tanks have an inner vessel 78 inches in diameter and over 36 ft. long. Hard aluminum banding strips 1¾ inches wide and covering about 4% of the insulation area was used at 47-inch intervals and wrapped with 3.2 gms./sq. ft. glass fiber paper bulking strips. The installed density of the composite insulation was 60 layers/inch, and 14–16 lbs. tension was applied to the bands to provide stability at 1-g. acceleration and afford the same number of layers per inch in the banded area as in the unbanded area. In all cases, the stationary evaporation rate from these trailers has been less than ½% capacity per day, corresponding to an overall average insulation conductivity less than $0.025 \times 10^{-3}$ B.t.u./sq. ft. °F./ft., which approaches the ideal unsupported performance of the multiple-layer insulation.

The use of this invention has been explained in a simplified manner based on the assumption that the low conductive component material or radiation barrier component density which is optimal for ideal, unsupported insulation is also the optimal density for banded insulation. For example it is assumed that 60 layers/inch is always the best shield density for the 0.00025-inch thick aluminum foil-1.6 gm./sq. ft. glass fiber paper combination, hereinafter referred to as SI–62. This is not necessarily true in all embodiments. Inspection of Equation 6 shows that the overall (average) conductivity of banded insulation is the sum of contributions of the unbanded and the banded fractions. If the illustrative fibrous sheet density is reduced below the optimal 60 layers/inch, for example, the factor containing $k_o$ will tend to increase; but because the total weight of insulation to be stabilized is reduced, the factor containing $k_c$ will tend to decrease. Thus, the desired minimum value of $k_a$ will usually correspond to a low conductive component density somewhat different from that corresponding to minimum $k_o$. A few trial-and-error computations will disclose the true optimal low conductive component density for banded insulation. It is apparent that when the contribution of the banded area is small, then the optimal density will correspond closely to minimum $k_o$, and little added benefit will result from such trial-and-error computation. However, if the contribution of the banded fraction is large, then the best shield density may be significantly different from that corresponding to minimum $k_o$.

In one instance which clearly illustrates the above effect, it was found that a thick layer of SI–62 insulation subjected to high g-loading would exhibit lowest overall thermal conductivity if wrapped with a shield density of only about 40 layers/inch. Four thicknesses of 1.6 gms./sq. ft. bulking ($W_g = 8.0$) were used to obtain this low density.

Although preferred embodiments of this invention have been described in detail, it will be appreciated that modifications may be made and that some parts may be used without others, all within the contemplation and spirit of the invention. For example, multiple layer composite insulations other than the alternating foil and fiber type will benefit from the stabilization method of this invention.

The mechanics of stabilization appears, for example, to be about the same for both aluminum foil-glass fiber paper composite insulation and aluminum coated polyethylene terephthalate film composite insulation. The coefficients of friction between the components of both insulations, for example, are about equal. An enlarged cross-section of the metal-coated low conductive substrate support construction assembly would appear very similar to the FIG. 7 construction except that the reflective radiation barrier component 15 is bonded to the low conductive component substrate 16. The same bulking strips 25 could be employed. Also, the assembly method and apparatus of FIG. 6 would be appropriate for this embodiment except that component rolls 11 and 12 would be replaced with a single composite roll.

This invention may similarly be advantageously employed for stabilization of the previously described radiant heat reflecting body-containing paper by employing the principles of the FIGS. 4–7 construction thereto. In such cases, the radiation barrier reflective sheet 15 in FIG. 7 would be optional since the paper layer in such case would contain uniformly dispersed small reflecting bodies.

Similarly vacuum type composite insulations of intermediate quality will also benefit from the stabilization methods and apparatus of this invention. An example of such an insulation is a composite comprising alternate layers of metal foil e.g. aluminum, as the radiation barrier component and cellulose fiber paper of the kraft type as the low conductive component material.

For employing this invention with other forms of multilayer insulation besides the illustrated and exemplary SI–62, it is only necessary to determine experimentally the characteristic curves, FIG. 9, for compressibility and heat conductance in the banded area, and then by means of Equations 7 and 8 herein, calculate the most desirable values of $A_c$ and $P_c$ to provide needed stability. If desired, a graph similar to FIG. 10 may be prepared for easier selection of design variables. A curve equivalent to curve A of FIG. 9 will indicate the quantity $W_g$ of low-conductive materials needed beneath the band in order to maintain the optimal insulation density when subjected to the selected value of stabilizing compression $P_c$. As stated previously, this quantity of bulking $W_g$ may be provided by selecting one or more strips of low-conductive material of suitable unit weight. The bulking material may be the same as the low-conductive component of the multilayer insulation, or alternatively other materials may be employed, the selection being subject to factors such as compressibility and coefficient of friction as well as conductivity.

A problem which may be encountered in insulation systems stabilized by spiral banding is a phenomenon called "relaxation." Relaxation is the gradual permanent deformation of the materials used in the banded area which may occur over an extended period of service. It is believed to be caused by slippage, yielding, and/or breakage of the minute fibers in the highly compressed separator and bulking strips (when fibrous material is used).

Relaxation is more pronounced with high values of banding compression, such as may be encountered when designing for both minimum conductivity and high acceleration loads. Relaxation is also more severe when high stresses are reduced or removed, and re-applied frequently. For example, if the insulation is subjected repeatedly to extreme thermal cycles causing contraction and expansion of the bands, permanent deformation is accelerated, and sufficient relaxation may occur so that the insulation is no longer stable.

FIG. 8 shows how critical the problem may become. The steepness of the curves means that only a slight change in density due to relaxation will produce a marked change in frictional resistance to slippage.

One possible solution is to add a factor of safety during fabrication by over-compressing the banded areas so that the insulation can tolerate appreciable relaxation without becoming unstable. This procedure is inefficient since it increases the overall conductivity of the insulation throughout its service life. Another solution is to add more bands, i.e. increase the banded area, thereby introducing a factor of safety so that the insulation can tolerate expected relaxation without instability. This is even more inefficient thermally than over-compressing.

According to one preferred embodiment of this invention, compensation for relaxation may be provided without penalizing the insulation performance by the use of highly elastic bands applied spirally in the manner of FIGS. 4 and 6 herein. This band replaces the relatively inelastic band materials contemplated in the previously described embodiments of spiral banding.

Since the band spirals completely through the insulation thickness, the banding must be of materials which retain the requisite elasticity over wide ranges of temperatures. A strip of rubber or rubberoid material would be suitable for systems in which the temperatures across the insulation are not widely different from room temperature. However, for cryogenic service, rubber in the vicinity of the cold wall becomes stiff and loses much of its elasticity.

Other forms of elastic bands suitable for more extreme temperatures are shown in FIG. 11. A flat zig-zag spring formed of high yield-point wire is illustrated in FIG. 11a. Discontinuous metal bands of material such as aluminum are shown in FIGS. 11b, 11c, and 11d. The sections composing these latter bands may be connected by spring wire clips or buckles, which when inserted frequently along the band lengths provide the needed elasticity. FIG. 11e is another form of wire spring which may be prepared by permanently flattening a common cylindrical coil spring. Still another suitable form of elastic band, not illustrated, is a fabric strip woven from crinkled fibers in a manner to lend longitudinal elasticity. Examples of such fabrics are the stretchable plastic clothing now commercially available. Extreme temperatures may require the use of fibers other than plastic such as glass or ceramic. However, tests show that elastic bands constructed of fine plastic fibers such as nylon retain considerable elasticity even at cryogenic temperatures.

The elastic bands are preferably flat and as thin as possible. The use of a large diameter coiled spring would not be attractive due to its bulk and also to the instability of stacked layers of such coils.

One advantage of the elastic band embodiment is its ability to stretch or contract with very little change in the hoop tension which produces and maintains stabilizing compression. Its length changes in concert with any dimensional changes which occur in the insulation or inner vessel. Thus, the band must possess a low modulus of elasticity and a reasonably uniform spring constant over the range of elongation expected in service. The characteristics will vary, depending on many factors including band compression and severity of service. Many insulation systems can be satisfactorily stabilized, using bands which elongate at least 10% under the required tension without yielding.

Elastic bands produce a much more favorable distribution of compression through the insulation thickness than do inelastic bands. Ideally, interlayer compression should vary linearly from the highest value at the inner container to the lowest value at the outermost layer. Such a compression distribution corresponds to the stress distribution through the insulation thickness imposed by acceleration, and corresponds also to a minimum conductivity. Therefore, elastic banding not only avoids the need for thermally-detrimental factors-of-safety, but it also achieves better thermal conductivity than is possible with inelastic bands even when the relaxation problem is ignored. When compressible materials are banded with inelastic materials, the compression distribution is almost flat (uniform) throughout a large intermediate portion of the insulation thickness, which means that some layers are over-compressed in order that other layers will not be under-compressed. However, when highly elastic bands are used, each lap of the band contributes an equal increment of compression, and linearly is closely approached. Compression and band tension are related by the equation:

$$P_n = 2T(N-n)/DS \qquad (9)$$

where $P_n$ = compression at any layer $n$ counting from the inner container, p.s.i.
$T$ = band tension, lb.
$D$ = diameter of inner container, in.
$S$ = band width, in.
$N$ = total number of low-conductive component layers.

The tension required with elastic band is far less than that required with the inelastic bands for the same band compression. For example, one previously described example showed 17 lb. tension necessary to obtain 2 p.s.i. compression. With an elastic band, the tension required in this illustrative case is on the order of 1 lb., and essentially independent of the total number of layers of insulation to be stabilized.

FIG. 10 and the methods by which it is derived may be used as a guide to the performance of elastically banded insulation. However, performance will be noticeably superior to that predicted by FIG. 10 in view of the improved compression distribution mentioned above. The desired minimum band compression will be maintained regardless of the severity of service, while if inelastic bands are used, a factor of safety may be required to compensate for relaxation and ensure stability for extended service life.

It will be appreciated that the low-conductive compressible bulking material may be advantageously employed with elastic banding as well as inelastic banding, and affords the same advantages as previously described in conjunction with the inelastic material.

A preferred upper limit of insulated area portion above its stable density and under the banding is 20%, and best results are obtained when not more than 10% of such area is so compressed. On the other hand, the frictional force should be concentrated in at least 1% of the total insulated area for satisfactory stability. The basis for these limits is the previously discussed FIG. 10, which is a graph correlating banding compression and overall heat transmission.

In providing for stability under any given acceleration (e.g. 5 $g$'s) it is clear that banding to more than 20% of the total area is highly undesirable because the dashed curves rise abruptly and steeply to high values of Q when a greater area is placed under compression. The 20%-compressed area curve connects the high point of the "heel" in all constant acceleration curves, and represents the upper preferred limit for obtaining stability with this invention. The 10%-compressed area curve connects the approximate center of the "heels" and represents the upper limit for best results.

Referring again to FIG. 10, it can be seen that a lower limit for percent area under compression is not established by heat transfer considerations. That is, all constant $g$-curves continue downward toward lower values of percent-compressed area and lower values of Q. Instead, the lower limits have been found to depend on the particular type of compression means employed. In the case of banding, a preferred lower limit is 1% insulated area under compression and using bands at least ½-inch wide to avoid overstressing of the bands. For best results, the bands should be at least 1½ inches wide, which permits use of a 2-mil thick hard aluminum band without overstressing, and also provides an added margin of safety against an unstable "stack" in the banded area.

There are no known limits on the maximum compressive stress which may be applied to the minor part of the total insulated area, in accordance with this invention. When the composite insulation consists, for example, of alternating aluminum foil and glass fiber paper layers, the indications are that an upper limit for compression of glass fibers without permanent crushing, if one exists, is far above expected practice and possibly on the order of several hundred p.s.i.

An inspection of FIG. 10 shows that any lower limit for compressive stress will correspond to low $g$-loading and large area under compression. Stationary storage vessels which are normally free of acceleration loads due to movement may be constructed with very low banding compression sufficient only to prevent sagging. Regardless of the service, it is not usually desirable to design insulation for substantially less than about 1-$g$ loading; otherwise insulation displacement may occur due to handling the vessel during fabrication. A practical lower limit of compressive stress corresponds approximately to the intersection of the 1-$g$ curve and the 20% compression area curve, or about 0.1 p.s.i. Using lower compressive stresses causes substantial increases in heat transmission and may also lead to stability problems during the wrapping operation.

Figure 12:
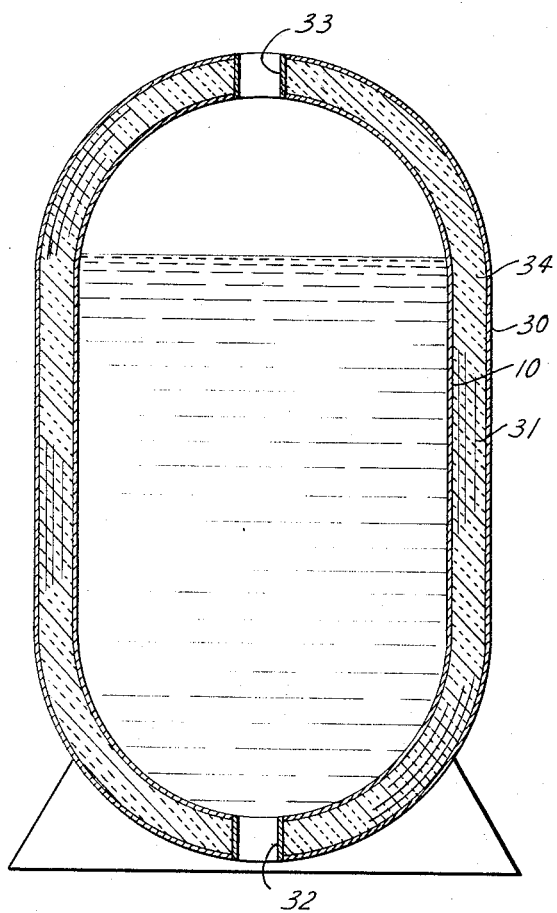
FIG. 12 is an elevation view, taken in cross-section, of a double-walled container constructed in accordance with this invention.

Referring now to FIG. 12, another embodiment of the invention comprises a container for the storing of materials at lower temperatures, including an inner vessel 10 having rigid, self-supporting walls for holding such material and a larger outer gas-tight shell 30 extending about said inner vessel. In most instances the outer shell 30 should also have rigid self-supporting walls in order to sustain the atmospheric pressure load thereupon. In certain instances however, such as in applications in outer space where there wouldn't be an atmospheric pressure load to contend with, the outer vessel need not be constructed with rigid self-supporting walls. An intervening evacuable insulation space 31 is provided between the inner vessel 10 and outer shell 30 at an absolute pressure not substantially greater than 25 microns of mercury. Inner vessel 10 is supported by suitable means as for example, bottom tube 32 and top tube 33, and various conduits and valving for introduction and discharge of fluid may be employed, as will be understood by those skilled in the art. These elements have not been shown in the interest of simplicity and do not constitute parts of the invention. Suitable piping and valving is, for example, illustrated and described in U.S. Patent No. 2,968,163 issued Jan. 17, 1961 to John H. Beckman.

The insulation space contains a composite insulation 34 in a series of spaced layers. Each composite layer comprises a low heat conductive component and a radiation barrier component. In a preferred embodiment the low conductive component comprises a fibrous low conductive oriented material wherein the fiber diameters are less than about 20 microns, and a series of spaced radiation barriers of thickness between 0.002 mm. and 0.2 mm. coextensive with and being separated and supported by the fibrous oriented material. The components of this insulation 34 are not shown in detail in FIG. 12, but may be assembled in the manner of FIG. 5 (without bulking), or FIG. 7 (with bulking). The radiant heat barrier component-low conductive component composite insulating material is spirally wound around the inner vessel sufficiently closely to provide at least 4 composite layers per inch of composite insulation, and disposed generally perpendicular to the direction of heat transfer across the space. The previously described multiple tension band means for concentrating the total frictional force between the layers of the composite insulation are also provided.

The radiation barrier or shield material may comprise either a metal or metal coated material, such as aluminum coated plastic film, or other radiation reflective material. Radiation reflective materials comprising thin metallic foils are admirably suited in the practice of the present invention. The foils should have sufficient thickness to resist tearing or other damage during installation. For high-quality insulations, the foil should be as thin as practical, consistent with strength requirements. Thinness is beneficial because it facilitates folding and forming the insulation to fit the contour of the insulation space. It also minimizes the weight of the container and reduces the weight of insulation, which must be stabilized. In cyrogenic vessels, low density is additionally important because it reduces the time and the quantity of expensive refrigeration needed to cool down the inner vessel and establish a stable temperature gradient through the insulation. Foil thickness between 0.2 mm. and 0.002 mm. are suitable, and when aluminum foil is employed, thickness between 0.02 mm. and 0.005 mm. are preferred.

A preferred reflective shield is ¼ mil (0.00025 in. or 0.0062 mm. thick) plain, annealed aluminum foil without lacquer or other coating. Also, any film of oil resulting from the rolling operation should be removed as by washing. Other radiation reflective materials which are susceptible of use in the practice of the invention include tin, silver, gold, copper, cadmium or other metals. The emissivity of the reflective shield material should be between about 0.005 and 0.2, and preferably between 0.015 and 0.06. Emissivities of 0.015 to 0.06 (98.5% to 94.2% reflectively) are obtainable with aluminum and are preferred in the practice of this invention, while with more expensive materials such as polished silver, copper, or gold, emissivities as low as 0.005 may be obtained. The above ranges represent an optimum balance between the high performance and high cost of low emissivity materials.

The case constituent of the insulation is preferably a suitably low conductive permanently precompacted fibrous paper or "mat" material which may be produced in sheet form. Since the individual fiber diameters are less than 20 microns, the sheets are thin enough to be flexibly bent. These materials are commonly prepared by uniformly depositing finely spun or alternated fibers at a desired rate on a moving belt and subsequently compressing the mat as, for example, between compression rolls or by vacuum. Among suitable fiber materials are glass, plastics, cellulose and ceramics.

A preferred composite insulation of the alternate layer type includes between about 4 and 200 layers per inch of both aluminum foil and glass fiber paper.

Alternatively, the low conductive material component and the radiant heat barrier material component may be bonded together as, for example, a reflective metal-coated plastic or paper. The low conductive substrate must be capable of remaining under vacuum for long periods of time without suffering damage and preferably should not contain volatiles which are slowly released to the evacuated space. The preferred substrates are organic plastic films which are free of volatile plasticizers. The plastic should contain no material having an equilibrium vapor pressure at 20° C. in excess of 10 microns Hg abs. Polyester resins are satisfactory and a particularly suitable bonded composite is the previously mentioned aluminum-coated polyethylene terephthalate film. The previously described paper sheets may also be employed as the substrate.

The substrate should have a thickness of between about 0.0002 inch and 0.002 inch, one suitable commercially available polyethylene terephthalate film being 0.00025 inch (0.000625 cm.) thick. Substrates of thickness less than 0.0002 inch become extremely difficult to handle and often contain an excessive number of pinholes resulting in discontinuities in the radiant barrier. On the other hand, substrate thicknesses greater than 0.002 inch merely add unrequired solid material which is heavy, expensive, and contributes needless solid conduction.

The reflective metal coating should be sufficiently thick to provide a low emissivity, preferably less than 0.06. Thus a coating possessing high reflectivity may be thinner than a coating of lower reflectivity. Suitable metals include gold, silver, copper and aluminum, the latter being preferred from the standpoint of cost. An aluminum coating thickness of about 0.0025 micron on the polyethylene terephthalate film has been found satisfactory.

If desired, the metal coated-low conductive substrate may be crimped or crumpled prior to insertion in the thermal insulating structure, so that only point contact between the layers is achieved. For example, the composite may be permanently wrinkled or creased generally parallel to the length of the composite with the wrinkles spaced approximately 1/8–1/4 inch.

As a further alternative, the radiant heat barrier material component may be in the form of finely divided reflecting bodies of sizes less than about 500 microns. These bodies are incorporated in and uniformly dispersed through the previously described precompacted paper layers in an amount between about 10% and 60% by weight of the paper. A binder as for example colloidal silica is used for cementing the heat reflecting bodies to the individual fibers of the paper. Less than about 10% by weight reflecting bodies does not achieve a significant radiation barrier effect whereas greater than 60% reflecting bodies produces bridging of such bodies through and along the paper surface. The latter results in a solid conductive path.

The fibers may, for example, be formed of glass, ceramic, quartz, or potassium titanate, depending on the temperatures to which the composite multi-layered insulation will be exposed. For example, at temperatures below about 900° F. glass fibers are preferred but at high temperatures glass tends to soften and the other enumerated materials are more suitable. When glass fibers are used, they are preferably of less than 5 microns diameter, while a fiber diameter range of 0.2 to 3.8 microns gives best results. The above range represents a preferred balance between increasing cost of relatively small diameter fibers, and increased conductance and gas pressure sensitivity of relatively large diameter fibers.

The finely-divided radiant heat reflecting bodies may, for example, be formed of aluminum, copper, nickel and molybdenum. Again the selection of the reflecting body is influenced by the operating temperature of the insulating composite. Aluminum is stable at temperatures below about 900° F. and is preferred in this range. Best results are obtained when the radiant heat reflecting bodies are relatively small, with particle sizes of less than 50 microns as the major dimension. Aluminum and copper paint pigment flakes of less than 0.5 micron thickness are especially suitable for relatively low temperature systems.

The reflecting body-containing paper may, for example, be formed on standard paper-making machines using colloidal silica as a binder. This paper and its manufacture are described more completely in copending application Ser. No. 211,176, now Patent No. 3,199,714, filed July 29, 1962 in the names of W. J. Bodendorf and D. I-J Wang, incorporated herein to the extent pertinent.

As a still further alternative, the low conductive material component may consist of cellulose fiber paper of the kraft type, although the insulation in such case will yield a performance of intermediate quality when compared to the performance of the very high quality insulation employing the low conductive materials aforementioned. For example, an insulation was composed of alternate layers of 1/4 mil aluminum foil and a thin, hard surface cellulose fiber paper of the kraft type (6.05 gm./sq. ft.) having fiber sizes in the range of 10–70 microns. This construction was found to be reasonably stable only at very high N-values of about 190–200 shields per inch, where its thermal conductivity under good vacuum below 1 micron Hg and between ambient and liquid nitrogen temperatures is about $0.075 \times 10^{-3}$ B.t.u./hr. sq. ft. ° F./ft. Over 90% of this heat conductivity is contributed by solid conduction which means that the construction lies well up on the right side of a performance curve similar to FIG. 3. Furthermore, the bulk density of the composite is about 39 lb./cu. ft. which is very high compared with the value of 6 lb./cu. ft. readily achieved in other multiple layer insulations. It is evident that both lower density and lower conductivity can be obtained by bulking the layers, using for example strips of cellulose paper of suitable thickness to reach the optimum point on the curve, in addition to the banding as disclosed hereinbefore.

As another variation, the invention has been specifically described in terms of insulating containers having curved outer surfaces, but it is equally suitable for flat surfaced, e.g., rectangular panels for insulating refrigerators. Also, the present insulation construction need not completely enclose the source of heat or cold as long as it is contiguously associated and in heat transfer relation with at least part of the source. For example, gas evacuated insulating structure spaces may be provided on the sides of a rectangular container and not on the bottom thereof.

The invention has also been specifically described in terms of a structure for minimizing the heat inleak to a container storing low-boiling liquefied gases. Other cold materials which may be thermally separated from atmospheric heat by employment of this invention include quick frozen biological specimens, living tissues and other perishable commodities.

The invention may also be used to great advantage in the insulation of a heat transferable container at high temperature, as for example, a rocket motor. In this event, heat is transferred to the atmosphere and the present structure serves to minimize the volume and/or weight of insulation. It should be recognized that materials selected for construction of the present structure should be stable at the temperatures to be encountered in usage. For example, if the thermal insulating structure is to be exposed to moderately high temperatures and a low conductive substrate is to be employed, the fluorinated polymers (e.g. polymers of tetrafluoroethylene) are especially suitable as the substrate.

What is claimed is:

1. A thermal insulating structure comprising gas-tight walls enclosing an evacuable space; multiple layers of heat insulative and radiation-impervious composite flexible insulating material within said space comprising a low heat conductive material component and a radiant heat barrier material component assembled sufficiently closely to provide at least 4 layers per inch of composite insulation, and disposed generally perpendicular to the direction of heat transfer across the insulation space; a multiplicity of substantially incompressible tension band means each having a width greater than its thickness and disposed in contiguous adjacency with and between at least some of said composite flexible insulating material layers and aligned in stacks across said insulation space with individual stacks spaced from each other and under sufficient tightness against the insulating material to concentrate the total frictional force between the composite layers in a minor part of the total insulated area beneath such tension band means whereby said minor part is compressed above its stable density and the remaining major part of such area is relatively uncompressed and below its stable density.

2. A thermal insulating structure according to claim 1 in which said multiple layers of composite flexible insulating material comprise permanently precompacted paper layers of fibers having diameters less than 20 microns being oriented substantially perpendicular to the direction of heat transfer across the insulation space, finely divided radiant heat reflecting bodies of sizes less than 500 microns being incorporated in and uniformly dispersed through the layers in an amount between 10% and 60% by weight of the paper, and a binder for cementing the heat reflecting bodies to said fibers.

3. A thermal insulating structure according to claim 1 in which layers of metal-coated, nonmetallic plastic material comprise said composite flexible insulating material.

4. A thermal insulating structure according to claim 1 in which alternating layers of metal foil of thickness between 0.002 mm. and 0.2 mm. and a thin low heat conductive permanently precompacted fibrous paper comprises said composite insulating material.

5. A thermal insulating structure according to claim 1 in which alternating layers of metal foil of thickness between 0.002 mm. and 0.2 mm. and cellulose fiber paper of the kraft type having fiber diameters between 10 and 70 microns comprises said composite flexible insulating material.

6. Apparatus according to claim 1 in which said bands concentrate the total frictional force upon between 1% and 20% of the total insulated area.

7. Apparatus according to claim 1 in which low conductive, compressible bulking material is provided in contiguous adjacency and in coextensive relationship with said tension band means, and between such band means and said composite flexible material.

8. Apparatus according to claim 1 in which low conductive, compressible bulking material is provided in contiguous adjacency and in coextensive relationship with said band means and between such band means and said composite flexible material, said bulking material being of such thickness in the installed compressed state that the number of low conductive component layers per inch of composite insulation in said minor part of the total insulated area beneath the band means is substantially the same as the number of low conductive component layers per inch in said remaining major part of such area.

9. A container for storing materials at low temperature comprising an inner vessel having rigid, self supporting walls for holding such material; a larger outer gas-tight shell extending about said inner vessel; an intervening evacuable space at an absolute pressure not substantially greater than 25 microns of mercury; multiple layers of a heat insulative and radiation-impervious composite flexible insulating material within said space comprising a low heat conductive material component and a radiant heat barrier material component assembled sufficiently closely to provide at least 4 layers per inch of composite insulation, and disposed generally perpendicular to the direction of heat transfer across the insulation space; substantially incompressible tension band means each having a width greater than its thickness and disposed in contiguous adjacency with and between at least some of said composite flexible insulating material layers and aligned in stacks with individual stacks across said insulation space spaced from each other, said tension bands extending laterally around said inner vessel and being spirally wound with said composite flexible insulating material sufficiently tightly to concentrate the total frictional force between the multiple layers in a minor part of the total insulated area beneath such band means whereby said minor part is compressed above its stable density and the remaining major part of such area is maintained relatively uncompressed and below its stable density.

10. Apparatus according to claim 4 in which low conductive, compressible fibrous material of the same composition as said fibrous sheet layers is provided in contiguous adjacency and in coextensive relationship with said tension band means, and between such band means and said composite flexible material, as said bulking material.

References Cited
UNITED STATES PATENTS

| | | | |
|---|---|---|---|
| 683,514 | 10/1901 | Stephens | 138—148 |
| 1,215,064 | 2/1917 | Ryan | 220—9 |
| 1,334,302 | 3/1920 | Hicks | 229—4.5 |
| 1,730,153 | 10/1929 | Lindsay | 220—9 |
| 1,956,323 | 4/1934 | Gregg | 220—9 |
| 1,973,880 | 9/1934 | Moody | 220—9 |
| 2,570,786 | 10/1951 | Flynn et al. | 156—190 |
| 2,863,179 | 12/1958 | Gaugler | 220—9 |
| 2,928,565 | 3/1960 | Glasoe | 220—9 |
| 2,966,101 | 12/1960 | Fienup | 156—190 |
| 2,967,152 | 1/1961 | Matsch et al. | 220—9 |
| 3,007,596 | 11/1961 | Matsch | 220—9 |
| 3,009,600 | 11/1961 | Matsch | 220—9 |
| 3,018,016 | 1/1962 | Hnilicka | 220—10 |
| 3,147,877 | 9/1964 | Beckman | 220—9 |

THERON E. CONDON, *Primary Examiner.*

R. A. JENSEN, *Assistant Examiner.*

JAMES R. GARRETT, *Examiner.*